United States Patent
Tyebkhan et al.

(10) Patent No.: US 10,691,509 B2
(45) Date of Patent: Jun. 23, 2020

(54) DESIRED SOFTWARE APPLICATIONS STATE SYSTEM

(71) Applicant: Microsoft Technology Licensing, LLC, Redmond, WA (US)

(72) Inventors: Arwa Zoher Tyebkhan, Redmond, WA (US); Carlos G Perez, Seattle, WA (US); Yee Hay Jonathan Leung, Minneapolis, MN (US); John R Selbie, Redmond, WA (US); Tai Jonah Enrico, Redmond, WA (US); Zhihua Dong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/036,587

(22) Filed: Jul. 16, 2018

(65) Prior Publication Data

US 2020/0019448 A1 Jan. 16, 2020

(51) Int. Cl.
*G06F 9/54* (2006.01)
*G06F 16/13* (2019.01)

(52) U.S. Cl.
CPC ............. *G06F 9/542* (2013.01); *G06F 16/13* (2019.01)

(58) Field of Classification Search
None
See application file for complete search history.

(56) References Cited

U.S. PATENT DOCUMENTS

| 5,944,782 | A  | * | 8/1999  | Noble    | G06F 9/542   |
|           |    |   |         |          | 709/202      |
| 7,827,193 | B2 | * | 11/2010 | Chiba    | G06F 16/176  |
|           |    |   |         |          | 707/781      |
| 2009/0220062 | A1 | * | 9/2009 | Wu      | H04M 1/57    |
|           |    |   |         |          | 379/201.01   |
| 2011/0026075 | A1 | * | 2/2011 | Maruyama | H04N 1/00408 |
|           |    |   |         |          | 358/1.15     |
| 2012/0192086 | A1 |   | 7/2012 | Ghods et al. | |
| 2013/0232254 | A1 |   | 9/2013 | Srikanth et al. | |
| 2016/0380915 | A1 |   | 12/2016 | Umapathy et al. | |
| 2018/0115643 | A1 |   | 4/2018 | Skiba et al. | |

OTHER PUBLICATIONS

"About FCM Messages", Retrieved from https://firebase.google.com/docs/cloud-messaging/concept-options, Retrieved on May 8, 2018, 16 Pages.

(Continued)

*Primary Examiner* — Craig C Dorais
(74) *Attorney, Agent, or Firm* — Schwegman Lundberg & Woessner, P.A.

(57) ABSTRACT

A desired state system monitors an activity of a first product operating on a machine. The desired state system determines a second product that is connected to the first product. The first product and the second product are both part of a family of products. The desired state system determines an activity of the second product installed on the machine, and a desired activity of the second product on the machine. The activity of the second product is compared with the desired activity of the second product. The desired state system generates a customized message based on the comparison at the machine.

20 Claims, 15 Drawing Sheets

(56) References Cited

OTHER PUBLICATIONS

"Complete Feature List HybridCloud Access and Storage", Retrieved from https://www.egnyte.com/file-server/online-file-server-features.html, Retrieved on May 18, 2018, 18 Pages.

"OneDrive brings new file collaboration and management features to the enterprise", Retrieved from https://www.microsoft.com/en-us/microsoft-365/blog/2017/01/24/onedrive-brings-new-file-collaboration-and-management-features-to-the-enterprise/, Jan. 24, 2017, 10 Pages.

"OwnCloud Enterprise Edition Features", Retrieved from https://owncloud.com/features/, Retrieved on May 18, 2018, 10 Pages.

Smith, Russell, "Create a Cloud Storage Local Cache Using Azure File Sync", Retrieved from https://www.petri.com/create-cloud-storage-local-cache-using-azure-file-sync, Oct. 25, 2017, 8 Pages.

* cited by examiner

DESIRED SOFTWARE APPLICATIONS STATE SYSTEM

BACKGROUND

Cloud computing provides additional computing and storage resources available to users of local machines. However, users on the local machines may neglect to configure their local machines to take advantage of the cloud computing and storage resources. The local machines may generate limited generic notifications of the additional computing resources that are often neglected by the users of the local machines.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
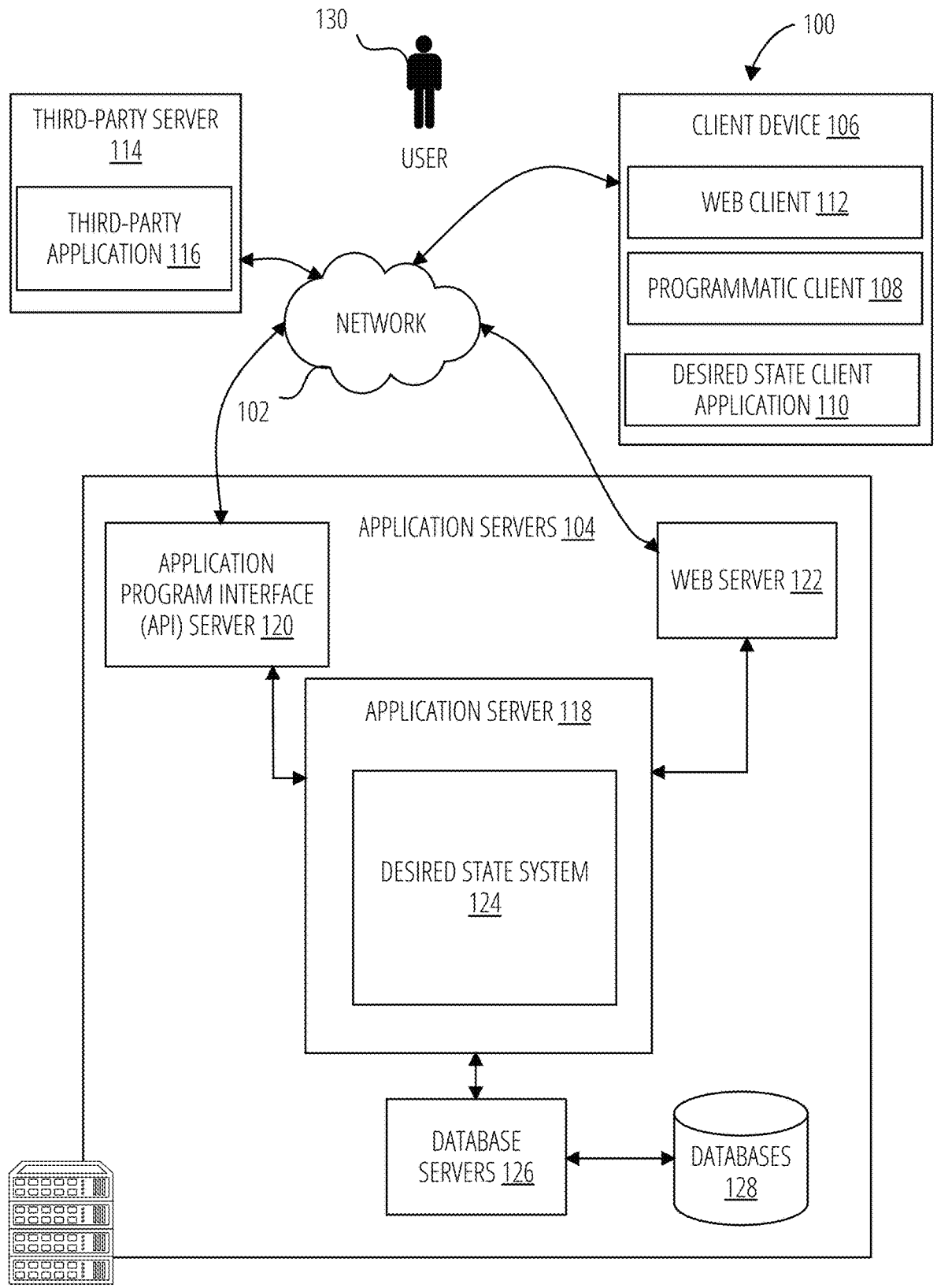
FIG. 1 is a diagrammatic representation of a networked environment in which the present disclosure may be deployed, in accordance with some example embodiments.

"Processor" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal Medium" in this context refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Machine-Storage Medium" in this context refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Computer-Readable Medium" in this context refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Component" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" in this context refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Communication Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

A desired state for a local machine to utilize cloud computing resources may include certain configurations settings between products or software components operating on the local machine. For example, for cloud connected components, the desired state may include being signed in and setting up with a cloud storage sync client, and having the user's default folders automatically redirected to a folder that is synced with the cloud storage resource (e.g., OneDrive by Microsoft, Inc.). Other desired state can include "healthy" behaviors such as active usage via the cloud storage resource, multi-endpoint usage, and sharing content with other users.

The present disclosure describes various aspects of a messaging system that is tailored to the current user state (e.g., file activities, file storage configuration setting) or their social state (e.g., file shared actvities). Example of the messaging system operations include:

- tailoring message urgency over time as users continue to use their local file system to store file content instead of the cloud storage resource, and as a function of the volume/importance/social activity on the files in their local file system;
- tailoring message intensity based on hours used with local content on the local machine;
- tailored timing, message, and urgency based on user social/network state (e.g., a file was just shared with them; the user should set up their cloud account for optimal experience with the group of software products/components installed on the local machine); and
- triggered messages to save documents into the cloud storage system based on incoming activity triggers (e.g. first write action, write of an office document, local write action).

Therefore, the present document describes monitoring user state and/or their network state and tailoring relevant messages over time to guide the users into using the cloud storage resource and towards "healthy" usage (e.g., default configuration settings with other related products).

In accordance with example embodiments, a desired state system monitors an activity of a first product (e.g., launching a text editing application, saving a file in a folder via an operating system on the machine) operating on a machine. The desired state system determines a second product (e.g., file syncing application with a cloud service related to the operating system) that is connected to the first product. The first product and the second product are both part of a family of products (e.g., text editing application and cloud file syncing application). The desired state system determines an activity of the second product (e.g., whether a default saving folder is configured to save to cloud storage service) installed on the machine, and a desired activity of the second product (e.g., configure the text editing application to save in a default folder that is synced with the cloud storage service) on the machine. The activity of the second product is compared with the desired activity of the second product. The desired state system generates a customized message based on the comparison at the machine.

As a result, one or more of the methodologies described herein facilitate solving the technical problem of non-optimal states where components of softwares are not set up or configured in a desired state for optimal usage. As such, one or more of the methodologies described herein may obviate a need for certain efforts or computing resources that otherwise would be involved in generating irrelevant notification and untimely messages, resources used by one or more machines, databases, or devices (e.g., within the environment) may be reduced the relevancy of the messages is based on the file activities. Examples of such computing resources include processor cycles, network traffic, memory usage, data storage capacity, power consumption, network bandwidth, and cooling capacity.

FIG. 1 is a diagrammatic representation of a network environment in which some example embodiments of the present disclosure may be implemented or deployed.

One or more application servers 104 provide server-side functionality via a network 102 to a networked user device, in the form of a client device 106. The client device 106 includes a web client 112 (e.g., a browser), a programmatic client 108 (e.g., an "app") that is hosted and execute on the web client 112, and a desired state client application 110 that monitors user activities on the client device 106 and generates custom messages to the user 130 via the client device 106.

An Application Program Interface (API) server 120 and a web server 122 provide respective programmatic and web interfaces to application servers 104. A specific application server 118 hosts a desired state system 124, which includes components, modules and/or applications.

The web client 112 communicates with the desired state system 124 via the web interface supported by the web server 122. Similarly, the programmatic client 108 communicates with the desired state system 124 via the programmatic interface provided by the Application Program Interface (API) server 120. The desired state client application 110 communicates with the desired state system 124.

The third-party application 116 may, for example, be another cloud storage system.

The application server 118 is shown to be communicatively coupled to database servers 126 that facilitates access to an information storage repository or databases 128. In an example embodiment, the databases 128 includes storage devices that store information to be published and/or processed by the desired state system 124.

Additionally, a third-party application 116 executing on a third-party server 114, is shown as having programmatic access to the application server 118 via the programmatic interface provided by the Application Program Interface (API) server 120. For example, the third-party application 116, using information retrieved from the application server 118, may supports one or more features or functions on a website hosted by the third party.

Figure 2:
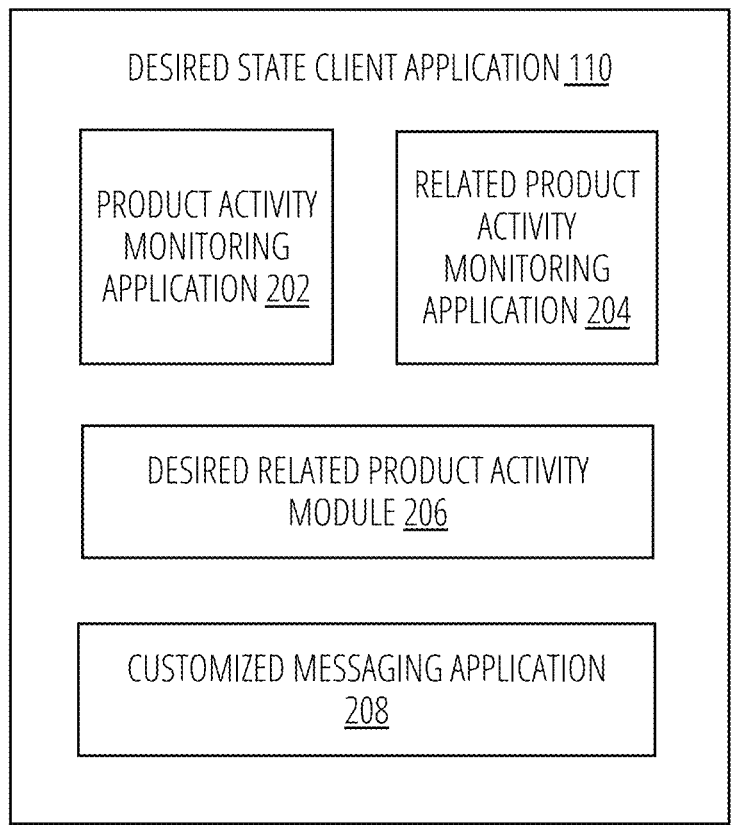
FIG. 2 is a block diagram illustrating a desired state client application in accordance with one example embodiment.

FIG. 2 is a block diagram illustrating a desired state client application in accordance with one example embodiment. The desired state client application 110 comprises a product activity monitoring application 202, a related product activity monitoring application 204, a desired related product activity module 206, and a customized messaging application 208. The product activity monitoring application 202 monitors activities related to a first product operating on the client device 106. For example, the product activity monitoring application 202 monitors file storage activities on the client device 106. In another example, the product activity monitoring application 202 monitors which types of files are stored using which application, and how often the files are written to a local storage of the client device 106. Other examples of file activities include who authored the files, how often the files are being saved, whether the files are being shared, which application was used to author the files, and so forth. The first product may be a text editing application or a storage application of the client device 106.

The related product activity monitoring application 204 identifies other products related to the first product and monitors the activities of the other products. For example, the first product may be an operating system, the second product may be a cloud storage client application configured to operate with the operating system. In another example, the first product may be text editing application, the second product may be a spreadsheet application. Both the first and second products may be part of a family of products. In another example the first product may be a first component of a family of products, and the second product may be a second component of the family of products. The related product activity monitoring application 204 monitors the usage of the other related products by the client device 106.

The desired related product activity module 206 identifies an optimized state of the related product or the family of products. For example, an optimized state may include the user 130 of the client device 106 signing into a text editing application and saving documents generated by the text editing application at the databases 128 of the application servers 104. In another example, the optimized state may include a usage or configuration setting of the other related product by configuring the client device 106 to save documents in a default location or folder that is synced with the application servers 104 using a local cloud storage sync application. In another example, the desired related product activity module 206 determines a desired level of activities of a related product (e.g., the user used product A but not enough of product B that is connected or related to product A).

The customized messaging application 208 generates a customized message based on a comparison of the product activity as determined by the product activity monitoring application 202, the related product activity as determined by the related product activity monitoring application 204, and the desired related product activity as identified by the desired related product activity module 206. For example, the product activity indicates that the user has been saving documents in a local drive of the client device 106 for several weeks since the initial set up of an operating system of the client device 106. The related product activity indicates that the user has not been setting up his default folder to be synced with a cloud storage application operating at the client device 106. The desired product activity is for the user to sign in to a cloud storage account associated with the cloud storage application and to set his default folder to be synced to the cloud storage account by the cloud storage application. Therefore, the customized messaging application 208 generates a message indicating or recommending usage of the cloud storage application to the user 130 at the client device 106. The timing of the message may be based on the frequency of file storage or file activities at the client device 106. The number of messages may increase with the frequency of file activities. In another example, the urgency or seriousness of the tailored pop up message may increase with the frequency of the file activities (e.g., "Your files are not protected").

Figure 3:
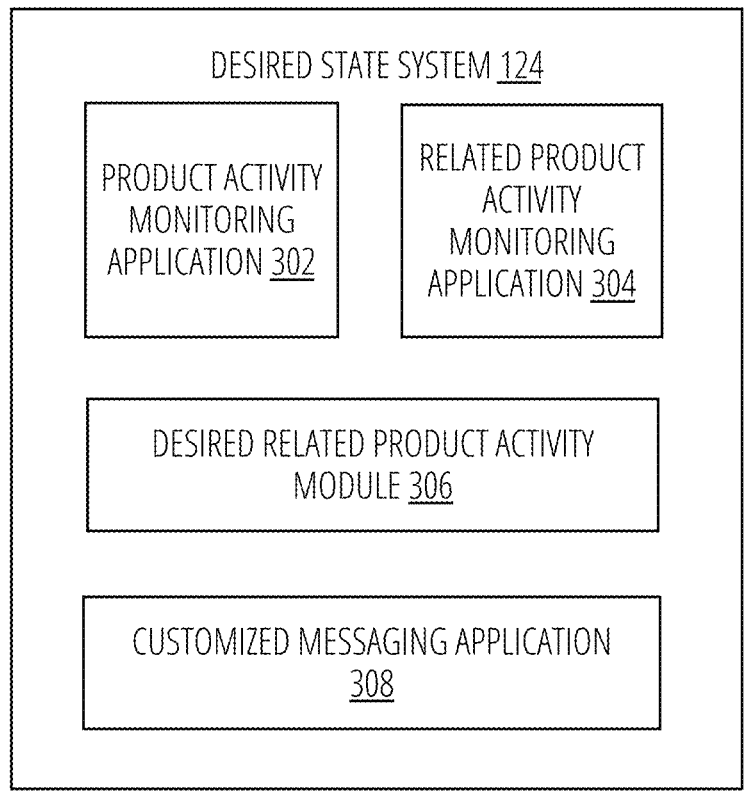
FIG. 3 is a block diagram illustrating a desired state system in accordance with one example embodiment.

FIG. 3 is a block diagram illustrating a desired state system in accordance with one example embodiment. The desired state system 124 may be similar to the desired state client application 110. For example, the desired state system 124 comprises a product activity monitoring application 302, a related product activity monitoring application 304, a desired related product activity module 306, and a customized messaging application 308. The product activity monitoring application 302 monitors activities related to a first product operating on the client device 106. For example, the product activity monitoring application 302 monitors file storage activities on the client device 106. In another example, the product activity monitoring application 302 monitors which types of files are stored using which application, and how often the files are written to a local storage of the client device 106. Other examples of file activities include who authored the files, how often the files are being saved, whether the files are being shared, which application was used to author the files, and so forth. The first product may be a text editing application or a storage application of the client device 106.

The related product activity monitoring application 304 identifies other products related to the first product and monitors the activities of the other products. The related product activity monitoring application 304 monitors the usage of the other related products by the client device 106.

The desired related product activity module 306 identifies an optimized state of the related product or the family of products.

The customized messaging application 308 generates a customized message based on a comparison of the product activity as determined by the product activity monitoring application 302, the related product activity as determined by the related product activity monitoring application 304, and the desired related product activity as identified by the desired related product activity module 306. For example, the product activity indicates that the user has been saving documents in a local drive of the client device 106 for several weeks since the initial set up of an operating system of the client device 106. The related product activity indicates that the user has not been setting up his default folder to be synced with a cloud storage application operating at the client device 106. The desired product activity is for the user to sign in to a cloud storage account associated with the cloud storage application and to set his default folder to be synced to the cloud storage account by the cloud storage application. Therefore, the customized messaging application 308 generates a message indicating or recommending usage of the cloud storage application to the user 130 at the client device 106. The timing of the message may be based on the frequency of file storage or file activities at the client device 106. The number of messages may increase with the frequency of file activities. In another example, the urgency or seriousness of the tailored pop up message may increase with the frequency of the file activities (e.g., "Your files are not protected").

Figure 4:
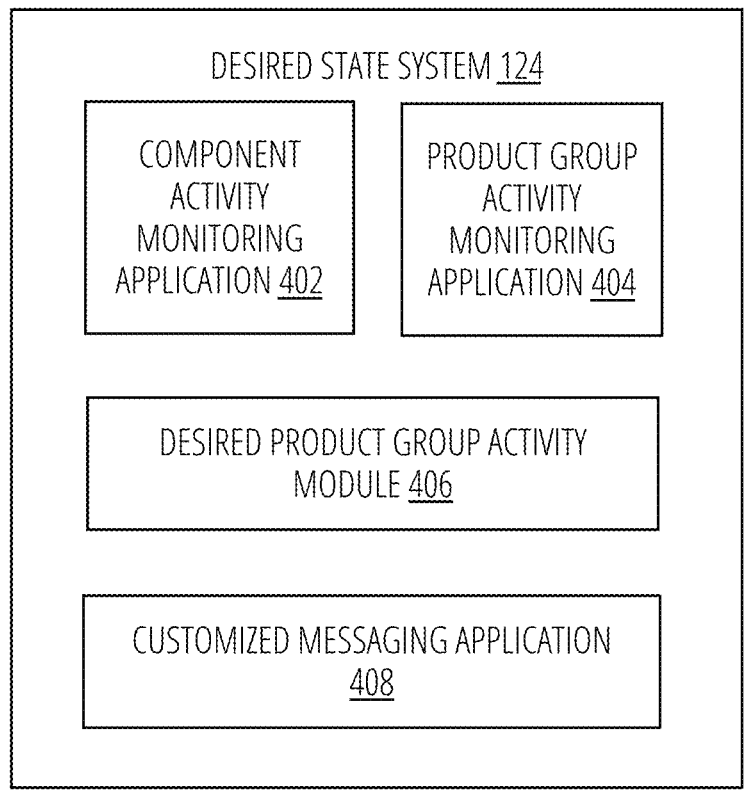
FIG. 4 is a block diagram illustrating a desired state system in accordance with another example embodiment.

FIG. 4 is a block diagram illustrating a desired state system in accordance with another example embodiment.

The desired state system 124 comprises a component activity monitoring application 402, a product group activity monitoring application 404, a desired product group activity module 406, and a customized messaging application 408. The component activity monitoring application 402 monitors activities related to a first component of a family of products operating or installed on the client device 106. For example, the component activity monitoring application 402 monitors file storage activities on an operating system at the client device 106. In another example, the component activity monitoring application 402 monitors which types of files are stored using which component or application, and how often the files are written to a local drive of the client device 106. Other examples of file activities include who authored the files, how often the files are being saved, whether the files are being shared, which application was used to author the files, and so forth. The first component may be a text editing application (from a suite or family of products) or a storage application of the client device 106. The family of products may include connected applications or components (e.g., text editing component, spreadsheet component, presentation component, email component).

The product group activity monitoring application 404 identifies other products or components from a family of components related to the first component and monitors the activities of the other products or components (e.g., the user 130 used the text application but has not used an email application that is part of a family of products that include the text application and the email application. The product group activity monitoring application 404 monitors the usage of the other related products from the family or group of products by the client device 106.

The desired product group activity module 406 identifies an optimized state of the group of products or the family of products. For example, after one week of usage of a first product, the first product should be used in conjunction with a second product from the family of products or components.

The customized messaging application 408 generates a customized message based on a comparison of the component activity as determined by the component activity monitoring application 402, the product group as determined by the product group activity monitoring application 404, and the desired product or component activity as identified by the desired product group activity module 406. For example, the product activity indicates that the user has been saving documents in a local drive of the client device 106 for several weeks since the initial set up of an operating system of the client device 106. The related product activity indicates that the user has not been setting up his default folder to be synced with a cloud storage application operating at the client device 106. The desired product activity is for the user to sign in to a cloud storage account associated with the cloud storage application and to set his default folder to be synced to the cloud storage account by the cloud storage application. Therefore, the customized messaging application 408 generates a message indicating or recommending usage of the cloud storage application to the user 130 at the client device 106. The timing of the message may be based on the frequency of file storage or file activities at the client device 106. The number of messages may increase with the frequency of file activities. In another example, the urgency or seriousness of the tailored pop up message may increase with the frequency of the file activities (e.g., "Your files are not protected").

Figure 5:
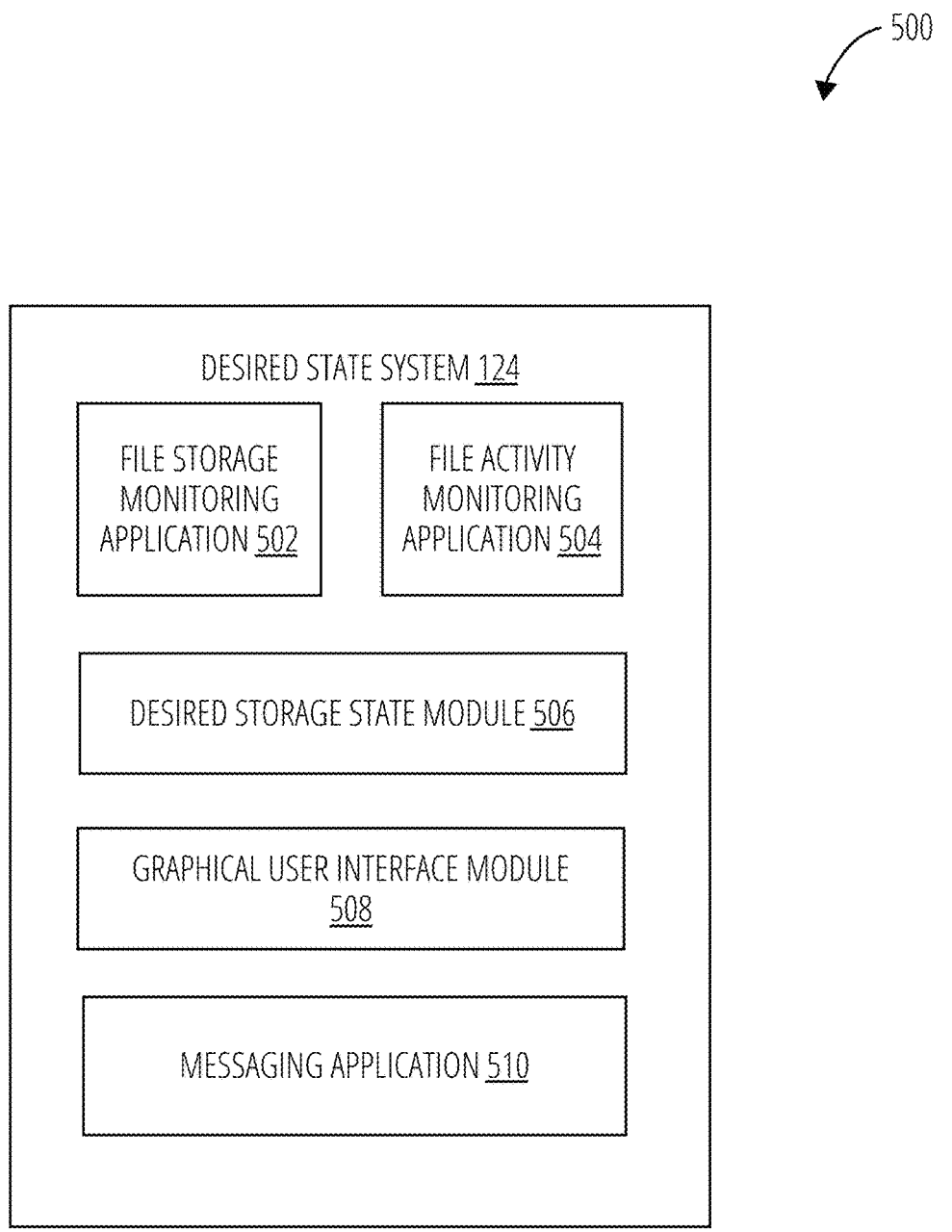
FIG. 5 is a block diagram illustrating a desired state system in accordance with another example embodiment.

FIG. 5 is a block diagram illustrating a desired state system in accordance with another example embodiment.

The desired state system 124 comprises a file storage monitoring application 502, a file activity monitoring application 504, a desired storage state module 506, and a graphical user interface module 508. The file storage monitoring application 502 monitors file storage activities on the client device 106.

The file activity monitoring application 504 identifies other products or components from a family of components related to the file storage application and monitors the activities of the other products or components (e.g., the user 130 saved files to a local drive but has not signed in to a cloud storage application). The file activity monitoring application 504 monitors the usage or configuration settings of the cloud storage application by the client device 106.

The desired storage state module 506 identifies a desired storage state or cloud storage configuration settings. For example, after one week of an initial set up of the client device 106, the client device 106 should be configured to store files in a default folder that is synced to a cloud storage resource. The desired storage state can be provided or predefined and provided by a developer of the family of products or components.

The graphical user interface module 508 generates a graphical user interface such as a pop up message or dialog box. The messaging application 510 generates a customized message included in the graphical user interface generated by the graphical user interface module 508. The customized message is based on a comparison of the file storage activities as determined by the file storage monitoring application 502, the file activities as determined by the file activity monitoring application 504, and the desired storage state as identified by the desired storage state module 506.

Figure 6:
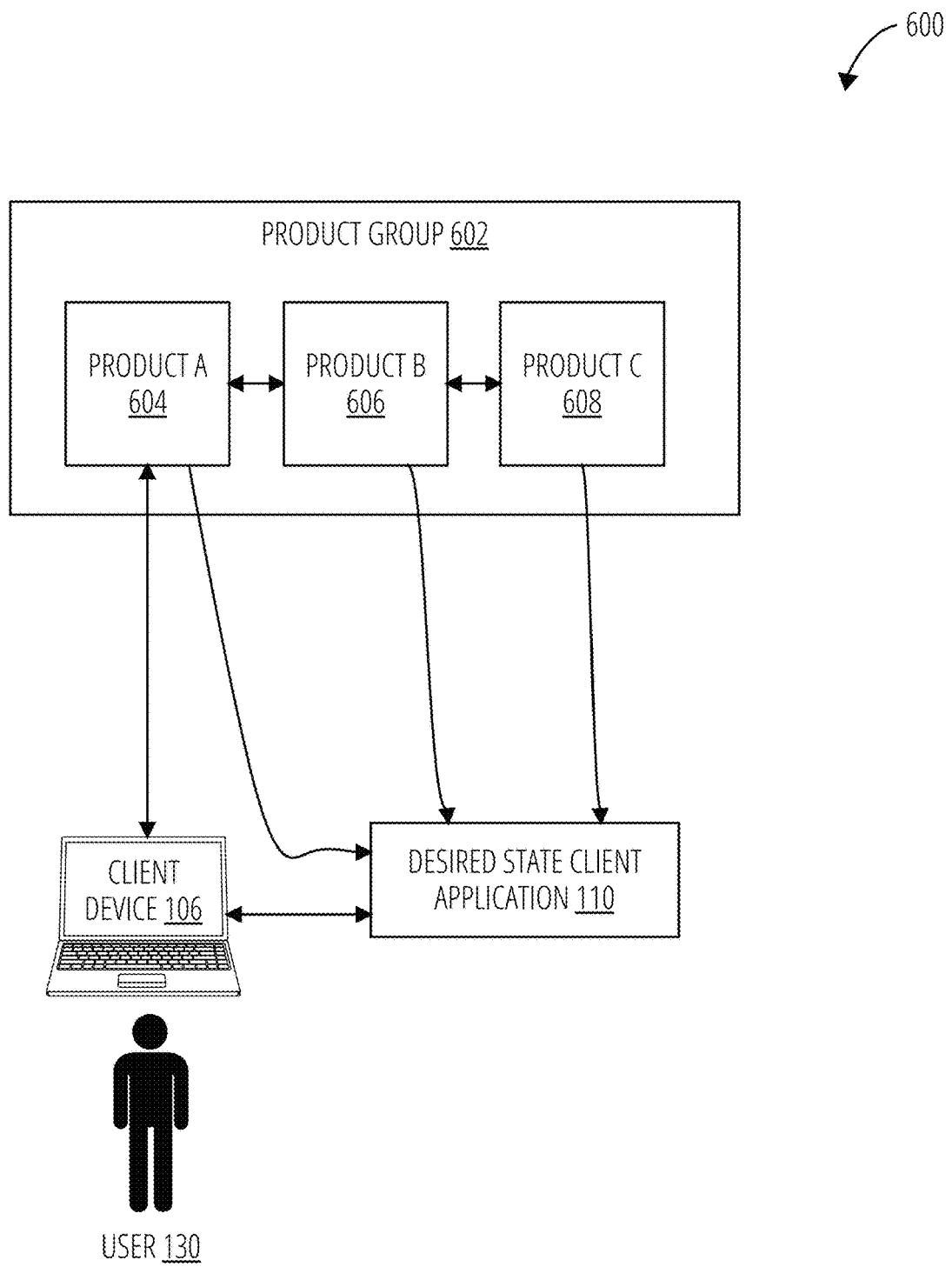
FIG. 6 is a block diagram illustrating an example of a product group in accordance with one example embodiment.

FIG. 6 is a block diagram illustrating an example of a product group in accordance with one example embodiment. The product group 602 includes, for example, a family of related or connected products such as product A 604, product B 606, and product C 608. The user 130 operates the client device 106. In particular, the desired state client application 110 detects that the user 130 interacts with primarily with product A 604. In another example, the 110 detects that the user 130 has interacted only with product A 604. In order to encourage usage of related product B 606 and product C 608, the desired state client application 110 generates a custom message tailored to the user 130 based on the user's interactions with product A 604 (e.g., how often and how long the user 130 has used product A 604). The custom message may introduce the user 130 to the products related to product A 604 from the product group 602. In one example, the custom message encourages the user 130 to configure and set the client device 106 to connect with product B 606 and product C 608. In one example embodiment, the custom message provides a first configuration setting for product B 606 and a second configuration setting for product C 608 to the client device 106.

Figure 7:
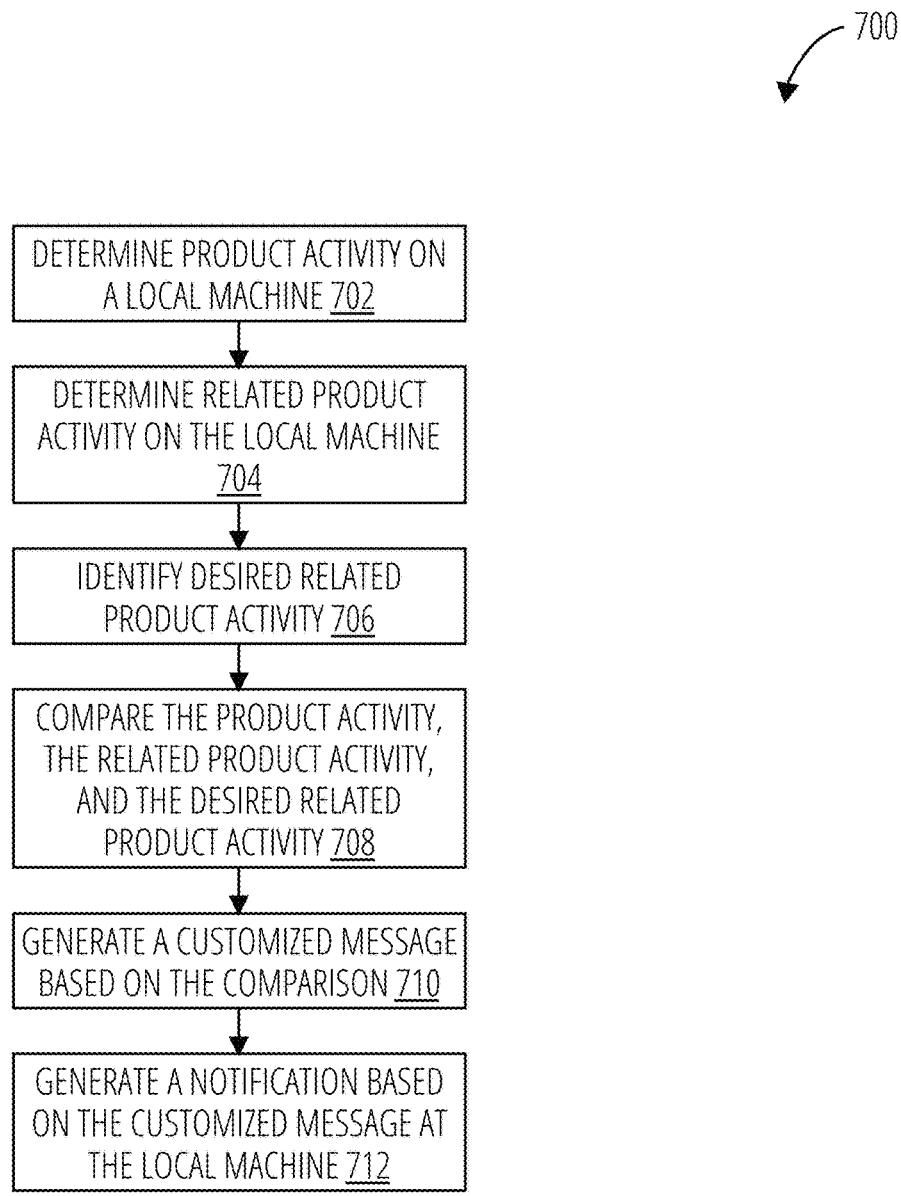
FIG. 7 is a flow diagram illustrating a method for generating a customized message in accordance with one example embodiment.

FIG. 7 is a flow diagram illustrating a method 700 for generating a customized message in accordance with one example embodiment. Operations in the method 700 may be performed by the desired state client application 110, using components (e.g., modules, engines) described above with respect to FIG. 2. Accordingly, the method 700 is described by way of example with reference to the desired state client application 110. However, it shall be appreciated that at least some of the operations of the method 700 may be deployed on various other hardware configurations or be performed by similar components residing elsewhere. For example, some of the operations may be performed at the desired state system 124.

In block 702, the product activity monitoring application 202 determines a product activity on the client device 106. At block 704, the related product activity monitoring application 204 determines related product activities on the client device 106. At block 706, the desired related product activity module 206 identifies desired related product activities. At block 708, the desired state client application 110 compares the product activity, the related product activity, and the desired related product activity. At block 710, the customized messaging application 208 generates a customized message based on the comparison. At block 712, the customized messaging application 208 causes a display of a notification based on or including the customized message.

Figure 8:
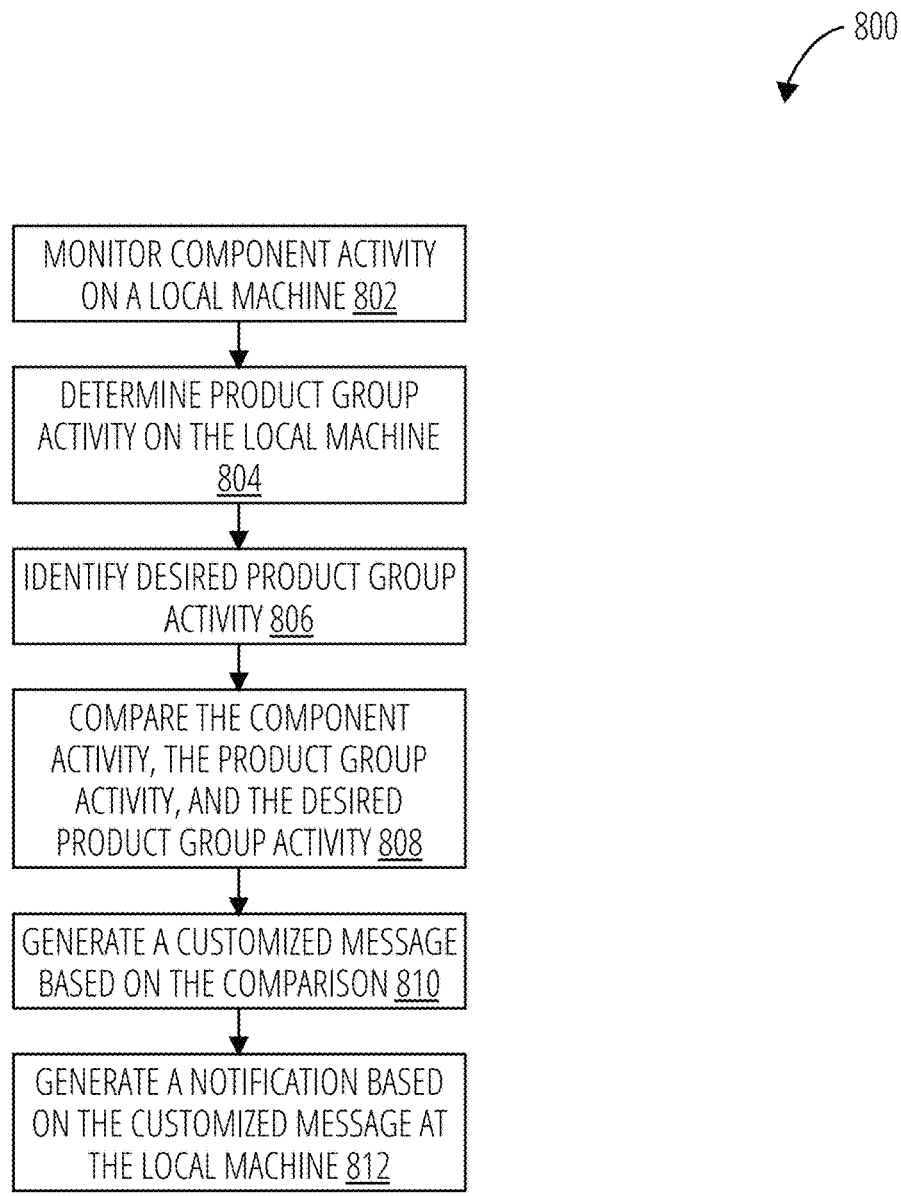
FIG. 8 is a flow diagram illustrating a method for generating a customized message in accordance with another example embodiment.

FIG. 8 is a flow diagram illustrating a method for generating a customized message in accordance with another example embodiment. Operations in the method 800 may be performed by the desired state system 124, using components (e.g., modules, engines) described above with respect to FIG. 4. Accordingly, the method 800 is described by way of example with reference to the desired state system 124. However, it shall be appreciated that at least some of the operations of the method 800 may be deployed on various other hardware configurations or be performed by similar components residing elsewhere. For example, some of the operations may be performed at the desired state client application 110.

In block 802, the component activity monitoring application 402 determines a component activity (of a product, a group of products, or a family of components) on the client device 106. At block 804, the product group activity monitoring application 404 determines product group activity on the client device 106. At block 806, desired product group activity module 406 identifies desired product activities. At block 808, the desired state system 124 compares the component activity, the product group activity, and the desired product group activity. At block 810, the customized messaging application 408 generates a customized message based on the comparison. At block 812, the customized messaging application 408 causes a display of a notification based on or including the customized message.

Figure 9:
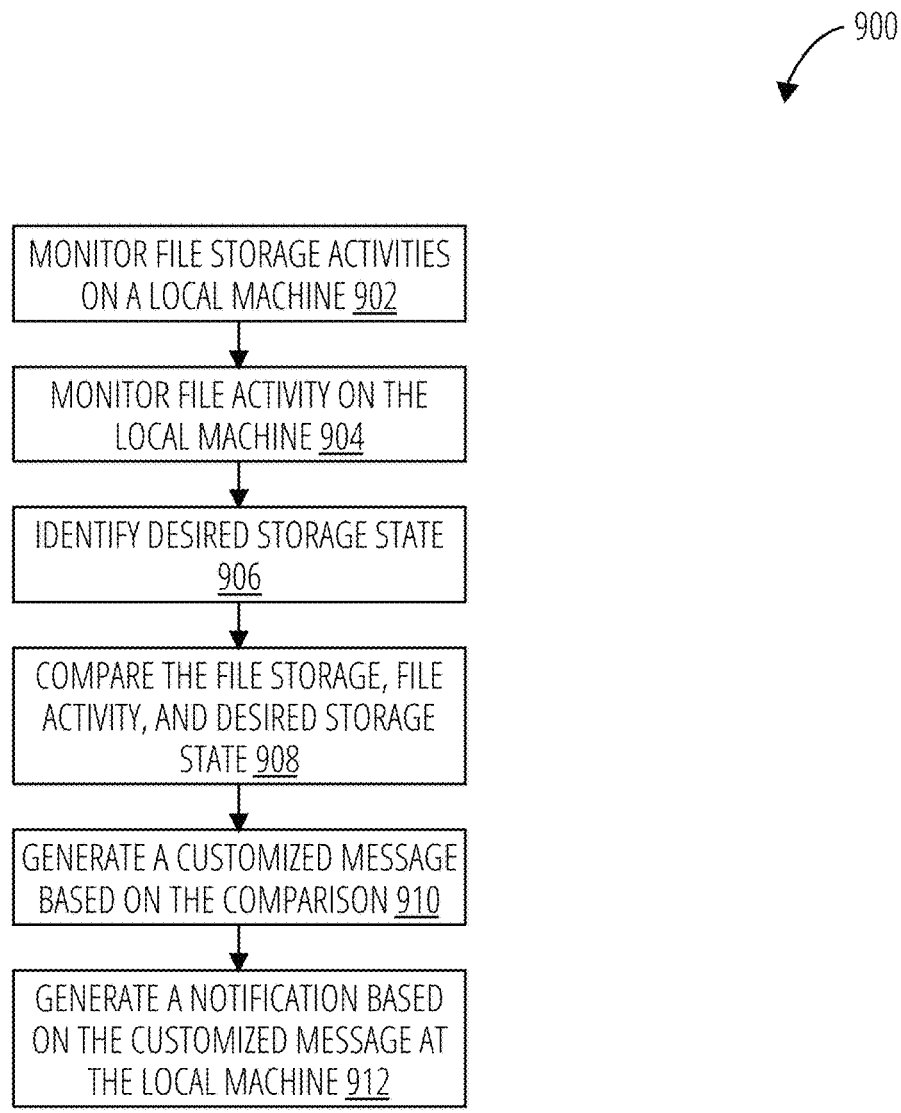
FIG. 9 is a flow diagram illustrating a method for generating a customized message in accordance with another example embodiment.

FIG. 9 is a flow diagram illustrating a method for generating a customized message in accordance with one example embodiment. Operations in the method 900 may be performed by the file storage monitoring application 502, using components (e.g., modules, engines) described above with respect to FIG. 5. Accordingly, the method 900 is described by way of example with reference to the file storage monitoring application 502. However, it shall be appreciated that at least some of the operations of the method 900 may be deployed on various other hardware configurations or be performed by similar components residing elsewhere. For example, some of the operations may be performed at the desired state system 124.

In block 902, the file storage monitoring application 502 monitors file storage activities (e.g., read, write, edit) on the client device 106. At block 904, the file activity monitoring application 504 monitor file activities (e.g., sharing, which folder the files are written to, whether the folder is synced to a cloud storage resource via a cloud storage application) on the client device 106. At block 906, the desired storage state module 506 identifies a desired storage state. At block 908, the desired state system 124 compares the file storage activities, the file activities, and the desired storage state. At block 910, the messaging application 510 generates a customized message based on the comparison. At block 912, the graphical user interface module 508 causes a display of a notification based on or including the customized message at the client device 106.

Figure 10:
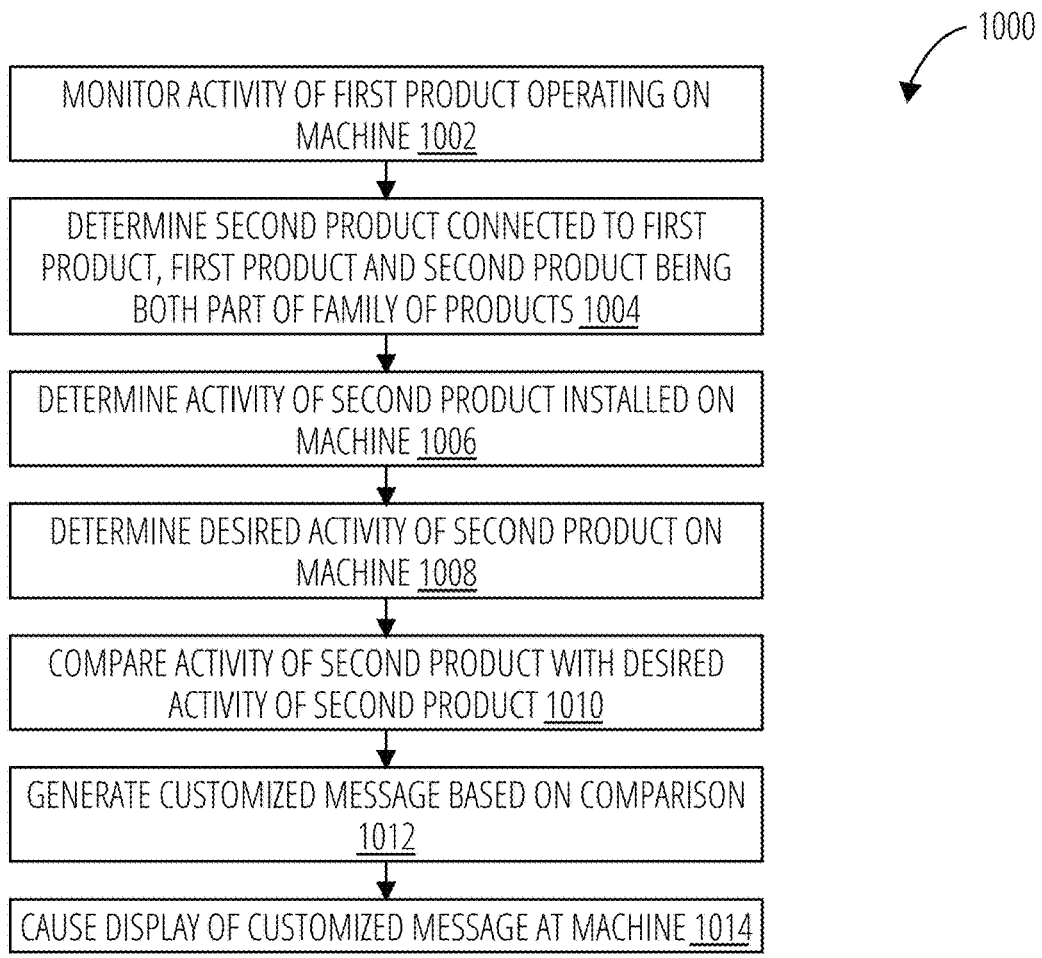
FIG. 10 is a flow diagram illustrating a method for generating a customized message in accordance with one example embodiment.

FIG. 10 is a flow diagram illustrating a method for generating a customized message in accordance with one example embodiment. In block 1002, routine 1000 monitors an activity of a first product operating on a machine. In block 1004, routine 1000 determines a second product connected to the first product, the first product and the second product being both part of a family of products. In block 1006, routine 1000 determines an activity of the second product installed on the machine. In block 1008, routine 1000 determines a desired activity of the second product on the machine. In block 1010, routine 1000 compares the activity of the second product with the desired activity of the second product. In block 1012, routine 1000 generates a customized message based on the comparison. In block 1014, routine 1000 causes a display of the customized message at the machine.

Figure 11:
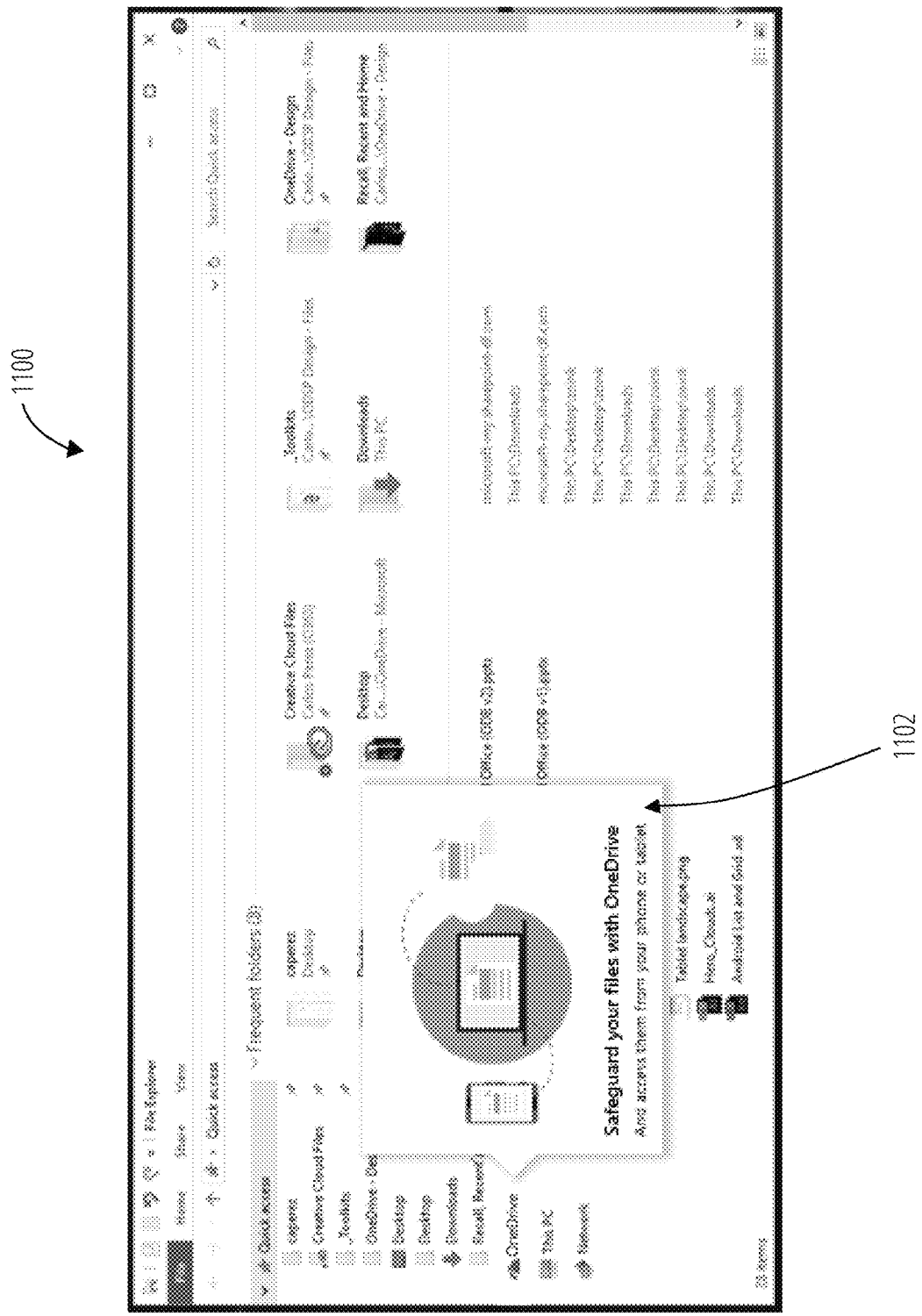
FIG. 11 illustrates an example of a custom message in accordance with one example embodiment.

FIG. 11 illustrates an example of a custom message in accordance with one example embodiment. A screenshot 1100 displays an example of a customized message 1102.

Figure 12:
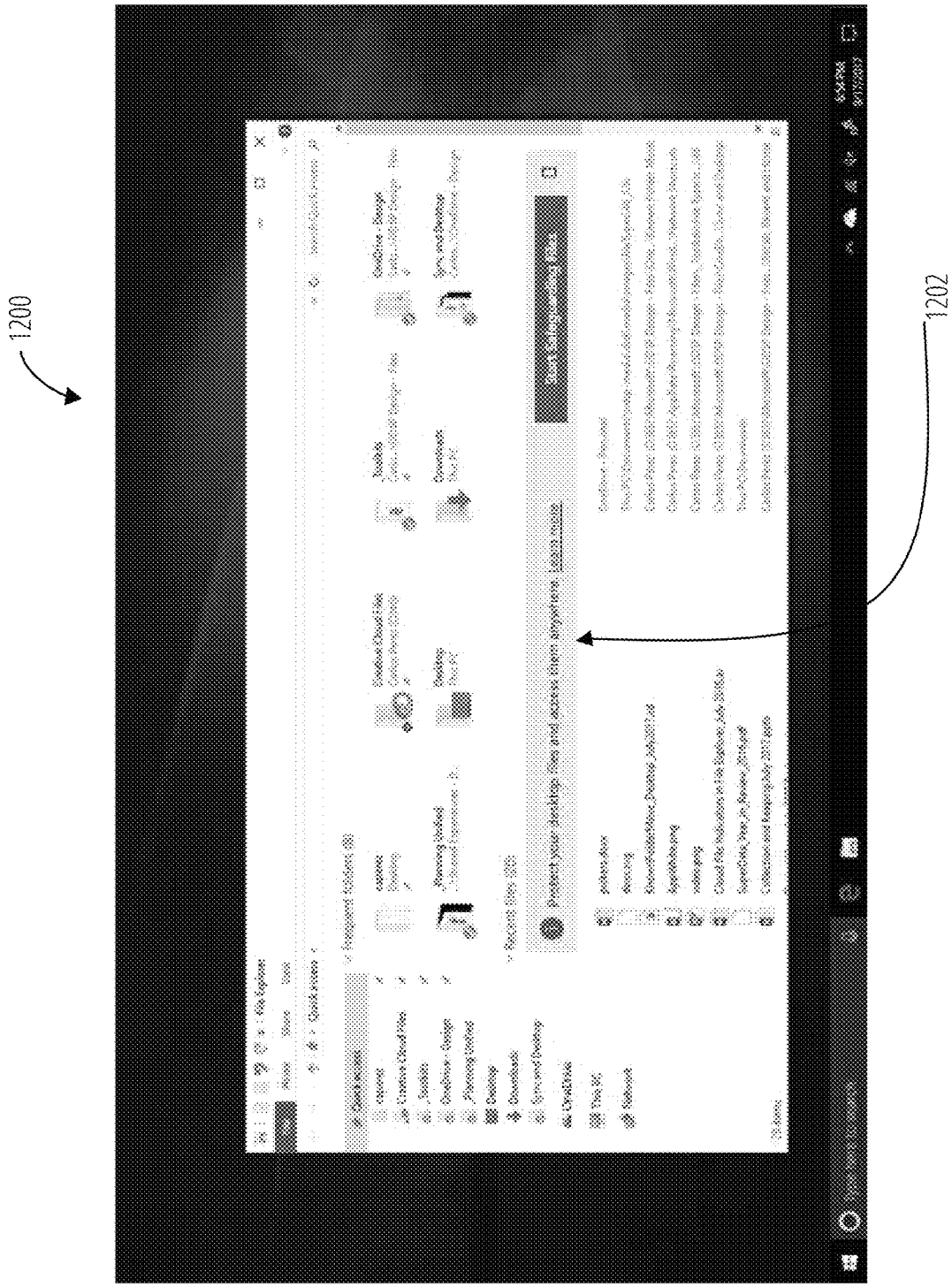
FIG. 12 illustrates an example of a custom message in accordance with another example embodiment.

FIG. 12 illustrates an example of a custom message in accordance with another example embodiment. A screenshot 1200 displays another example of a custom message 1202.

Figure 13:
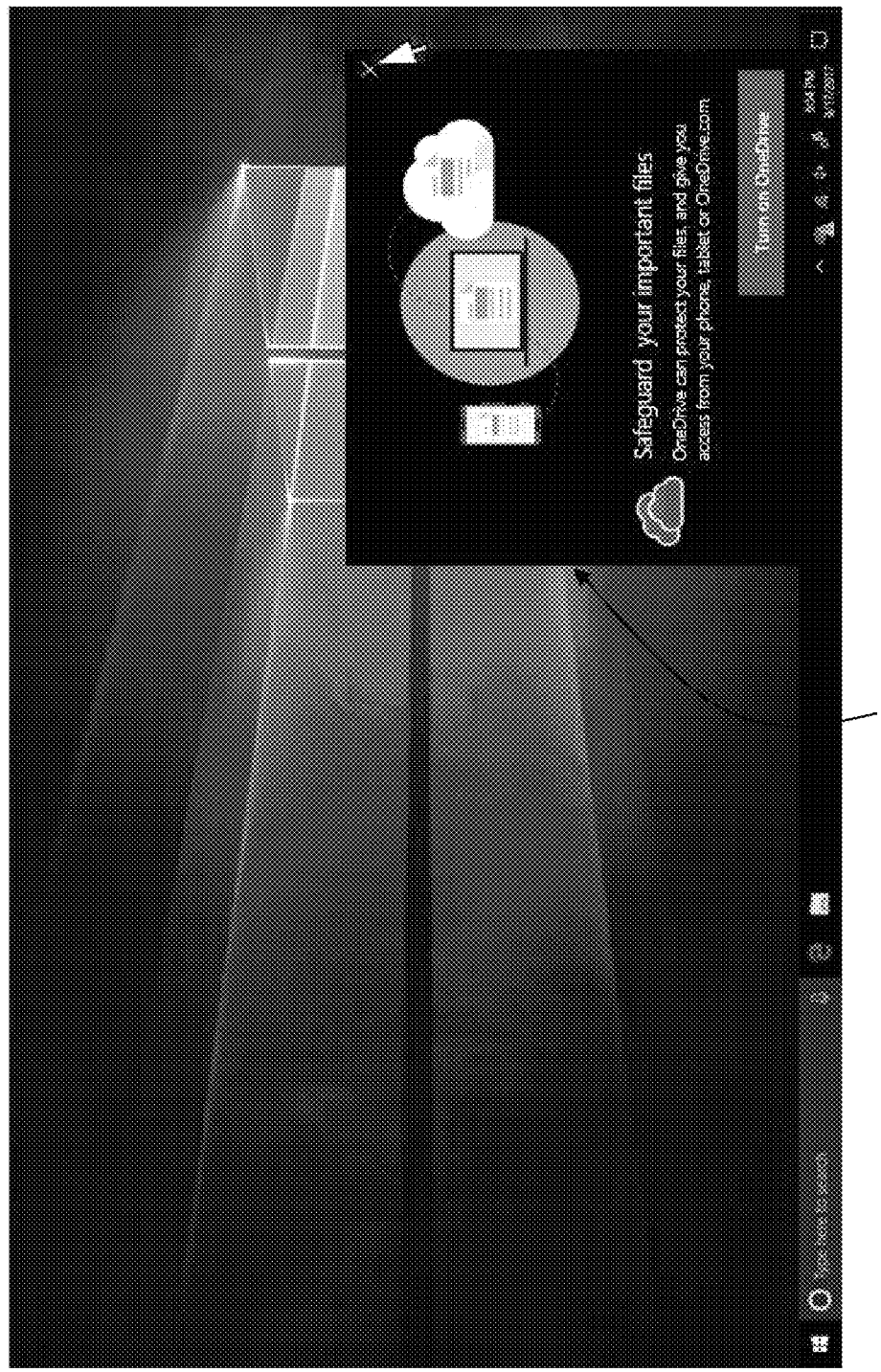
FIG. 13 illustrates an example of a custom message in accordance with another example embodiment.

FIG. 13 illustrates an example of a custom message in accordance with another example embodiment. A screenshot 1300 displays another example of a custom message 1302.

Figure 14:
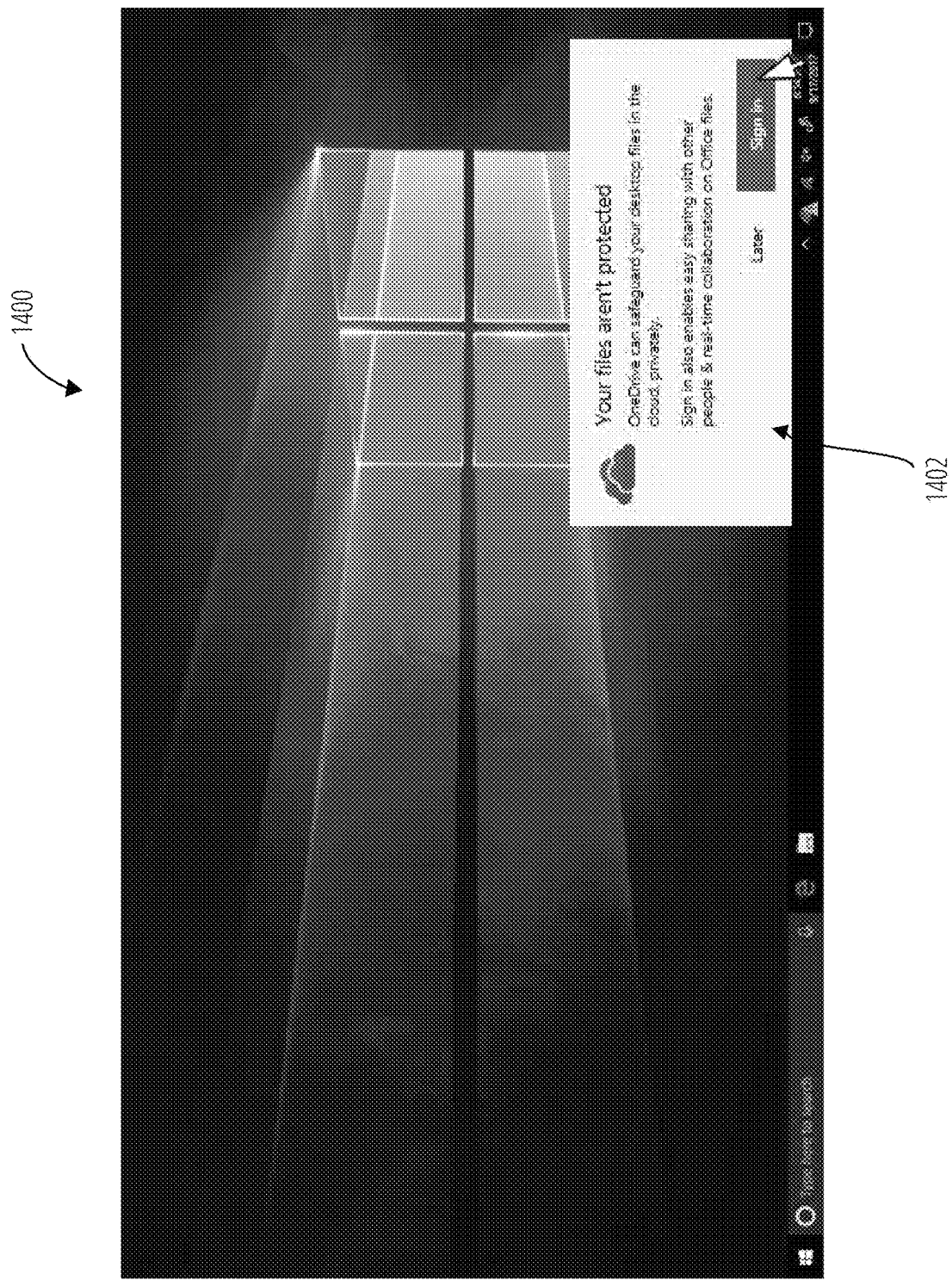
FIG. 14 illustrates an example of a custom message in accordance with another example embodiment.

FIG. 14 illustrates an example of a custom message in accordance with one example embodiment. A screenshot 1400 displays another example of a custom message 1402.

Figure 15:
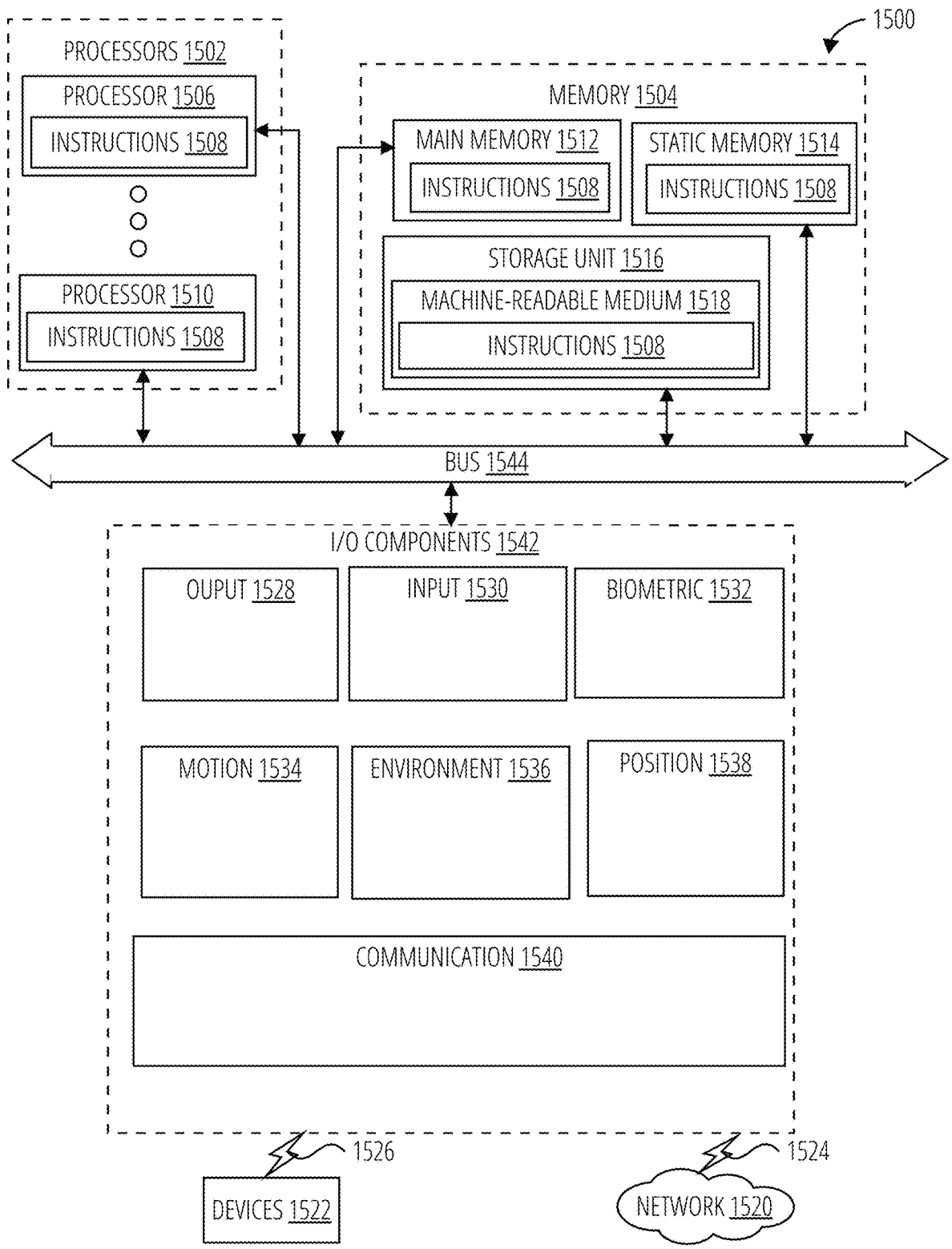
FIG. 15 is a diagrammatic representation of a machine in the form of a computer system within which a set of instructions may be executed for causing the machine to perform any one or more of the methodologies discussed herein, according to an example embodiment.

FIG. 15 is a diagrammatic representation of the machine 1500 within which instructions 1508 (e.g., software, a program, an application, an applet, an app, or other executable code) for causing the machine 1500 to perform any one or more of the methodologies discussed herein may be executed. For example, the instructions 1508 may cause the machine 1500 to execute any one or more of the methods described herein. The instructions 1508 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machines that individually or jointly execute the instructions 1508 to perform any one or more of the methodologies discussed herein.

The machine 1500 may include processors 1502, memory 1504, and I/O components 1542, which may be configured to communicate with each other via a bus 1544. In an example embodiment, the processors 1502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1506 and a processor 1510 that execute the instructions 1508. The term "processor" is intended to include multi-core processors that may comprise two or more independent processors (sometimes referred to as "cores") that may execute instructions contemporaneously. Although FIG. 15 shows multiple processors 1502, the machine 1500 may include a single processor with a single core, a single processor with multiple cores (e.g., a multi-core processor), multiple processors with a single core, multiple processors with multiples cores, or any combination thereof.

The memory 1504 includes a main memory 1512, a static memory 1514, and a storage unit 1516, both accessible to the processors 1502 via the bus 1544. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the processors 1502 (e.g., within the processor's cache memory), or any suitable combination thereof, during execution thereof by the machine 1500.

The I/O components 1542 may include a wide variety of components to receive input, provide output, produce output, transmit information, exchange information, capture measurements, and so on. The specific I/O components 1542 that are included in a particular machine will depend on the type of machine. For example, portable machines such as mobile phones may include a touch input device or other such input mechanisms, while a headless server machine will likely not include such a touch input device. It will be appreciated that the I/O components 1542 may include many other components that are not shown in FIG. 15. In various example embodiments, the I/O components 1542 may include output components 1528 and input components 1530. The output components 1528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1542 may include biometric components 1532, motion components 1534, environmental components 1536, or position components 1538, among a wide array of other components. For example, the biometric components 1532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 include acceleration sensor components (e.g., accelerometer), gravitation sensor components, rotation sensor components (e.g., gyroscope), and so forth. The environmental components 1536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1542 further include communication components 1540 operable to couple the machine 1500 to a network 1520 or devices 1522 via a coupling 1524 and a coupling 1526, respectively. For example, the communication components 1540 may include a network interface component or another suitable device to interface with the network 1520. In further examples, the communication components 1540 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 1522 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi® signal triangulation, location via detecting an NFC beacon signal that may indicate a particular location, and so forth.

The various memories (e.g., memory 1504, main memory 1512, static memory 1514, and/or memory of the processors 1502) and/or storage unit 1516 may store one or more sets of instructions and data structures (e.g., software) embodying or used by any one or more of the methodologies or functions described herein. These instructions (e.g., the instructions 1508), when executed by processors 1502, cause various operations to implement the disclosed embodiments.

The instructions 1508 may be transmitted or received over the network 1520, using a transmission medium, via a network interface device (e.g., a network interface component included in the communication components 1540) and using any one of a number of well-known transfer protocols (e.g., hypertext transfer protocol (HTTP)). Similarly, the instructions 1508 may be transmitted or received using a transmission medium via the coupling 1526 (e.g., a peer-to-peer coupling) to the devices 1522.

Examples

Example 1 is a computer-implemented method comprising: monitoring an activity of a first product operating on a machine; determining a second product connected to the first product, the first product and the second product being both part of a family of products; determining an activity of the second product installed on the machine; determining a desired activity of the second product on the machine; comparing the activity of the second product with the desired activity of the second product; generating a customized message based on the comparison; and causing a display of the customized message at the machine.

In example 2, the subject matter of example 1, wherein monitoring the activity of the first product further comprises: determining file storage activities on the machine; and determining that the first product stores files locally on the machine and not on a cloud system accessible via the second product.

In example 3, the subject matter of example 1 can optionally include determining a volume of the file storage activities on the machine, wherein the customized message is based on the volume of file storage activities on the machine exceeding a threshold volume.

In example 4, the subject matter of example 3 can optionally include adjusting an intensity of the customized message based on the volume of the file storage activities on the machine, the intensity of the customized message increasing with the volume of the file storage activities on the machine, the intensity indicating a level of urgency.

In example 5, the subject matter of example 1 can optionally include detecting a social activity related to a file on the machine, wherein the customized message is based on the detected social activity and triggered by the social activity.

In example 6, the subject matter of example 1, wherein the customized message identifies the second product.

In example 7, the subject matter of example 1, wherein the customized message identifies a recommended configuration setting of the second product.

In example 8, the subject matter of example 1, wherein the customized message identifies a recommended configuration setting of the first product.

In example 9, the subject matter of example 1, wherein the recommended configuration setting includes being logged in with the first product using a username and setting the first product to automatically save files to a default folder using the second product.

In example 10, the subject matter of example 1 can optionally include determining a trigger point in point based on the comparison; and causing the display of the customized message at the trigger point in time.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:
monitoring a user activity of a first product operating on a machine, the first product comprising a first software application;
determining a second product connected to the first product, the second product comprising a second software application, both the first and second software applications being part of a suite of software applications;
determining a user activity of the second product installed on the machine;
determining a desired activity of the second product on the machine;
comparing the user activity of the second product with the desired activity of the second product;
generating a customized message based on the comparison, the customized message identifying the second software application;
causing a display of the customized message at the machine, the customized message comprising a user interface element indicating a recommended configuration setting of the second software application, the recommended configuration setting being based on the comparison of the user activity of the second product with the desired activity of the second product;
detecting a selection of the user interface element on the machine; and in response to the detecting, configuring the second software application with the recommended configuration setting on the machine.

2. The computer-implemented method of claim 1, wherein monitoring the activity of the first product further comprises:
 determining file storage activities on the machine; and
 determining that the first product stores files locally on the machine and not on a cloud system accessible via the second product.

3. The computer-implemented method of claim 2, further comprising:
 determining a volume of the file storage activities on the machine, wherein the customized message is based on the volume of file storage activities on the machine exceeding a threshold volume.

4. The computer-implemented method of claim 3, further comprising:
 adjusting an intensity of the customized message based on the volume of the file storage activities on the machine, the intensity of the customized message increasing with the volume of the file storage activities on the machine, the intensity indicating a level of urgency.

5. The computer-implemented method of claim 1, further comprising:
 detecting a social activity related to a file on the machine, wherein the customized message is based on the detected social activity and triggered by the social activity.

6. The computer-implemented method of claim 1, wherein the customized message identifies the second product, wherein the second product is configured to be used in conjunction with the first product.

7. The computer-implemented method of claim 1, wherein the customized message identifies a recommended configuration setting of the second product based on the desired user activity for the second product.

8. The computer-implemented method of claim 1, wherein the customized message identifies a recommended configuration setting of the first product based on the desired user activity for the first product.

9. The computer-implemented method of claim 8, wherein the recommended configuration setting includes being logged in with the first product using a username and setting the first product to automatically save files to a default folder using the second product.

10. The computer-implemented method of claim 1, further comprising:
 determining a trigger point in point based on the comparison; and
 causing the display of the customized message at the trigger point in time.

11. A computing apparatus, the computing apparatus comprising:
 a processor; and
 a memory storing instructions that, when executed by the processor, configure the apparatus to perform operations comprising:
 monitor a user activity of a first product operating on a machine, the first product comprising a first software application;
 determine a second product connected to the first product, the second product comprising a second software application, both the first and second software applications being part of a suite of software applications;
 determine a user activity of the second product installed on the machine;
 determine a desired activity of the second product on the machine;
 compare the user activity of the second product with the desired activity of the second product;
 generate a customized message based on the comparison, the customized message identifying the second software application;
 cause a display of the customized message at the machine, the customized message comprising a user interface element indicating a recommended configuration setting of the second software application, the recommended configuration setting being based on the comparison of the user activity of the second product with the desired activity of the second product;
 detect a selection of the user interface element on the machine; and
 in response to the detecting, configure the second software application with the recommended configuration setting on the machine.

12. The computing apparatus of claim 11, wherein monitoring the activity of the first product further comprises:
 determine file storage activities on the machine; and
 determine that the first product stores files locally on the machine and not on a cloud system accessible via the second product.

13. The computing apparatus of claim 11, wherein the operations further comprise:
 determining a volume of the file storage activities on the machine, wherein the customized message is based on the volume of file storage activities on the machine exceeding a threshold volume.

14. The computing apparatus of claim 13, wherein the instructions further configure the apparatus to:
 adjust an intensity of the customized message based on the volume of the file storage activities on the machine, the intensity of the customized message increasing with the volume of the file storage activities on the machine, the intensity indicating a level of urgency.

15. The computing apparatus of claim 11, wherein the instructions further configure the apparatus to:
 detect a social activity related to a file on the machine, wherein the customized message is based on the detected social activity and triggered by the social activity.

16. The computing apparatus of claim 11, wherein the customized message identifies the second product, wherein the second product is configured to be used in conjunction with the first product.

17. The computing apparatus of claim 11, wherein the customized message identifies a recommended configuration setting of the second product based on the desired activity for the second product.

18. The computing apparatus of claim 11, wherein the customized message identifies a recommended configuration setting of the first product based on the desired activity for the first product.

19. The computing apparatus of claim 18, wherein the recommended configuration setting includes being logged in with the first product using a username and setting the first product to automatically save files to a default folder using the second product.

20. A non-transitory computer-readable storage medium, the computer-readable storage medium including instructions that when executed by a computer, cause the computer to:
 monitor a user activity of a first product operating on a machine, the first product comprising a first software application;

determine a second product connected to the first product, the second product comprising a second software application, both the first and second software applications being part of a suite of software applications;

determine a user activity of the second product installed on the machine;

determine a user desired activity of the second product on the machine;

compare the user activity of the second product with the user desired activity of the second product;

generate a customized message based on the comparison, the customized message identifying the second software application;

cause a display of the customized message at the machine, the customized message comprising a user interface element indicating a recommended configuration setting of the second software application, the recommended configuration setting being based on the comparison of the user activity of the second product with the desired activity of the second product;

detect a selection of the user interface element on the machine; and in response to the detecting, configure the second software application with the recommended configuration setting on the machine.

* * * * *